(12) United States Patent
Lam

(10) Patent No.: US 8,221,633 B2
(45) Date of Patent: Jul. 17, 2012

(54) CYCLONIC SEPARATOR

(75) Inventor: Joseph K-W Lam, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

(21) Appl. No.: 13/255,638

(22) PCT Filed: Mar. 5, 2010

(86) PCT No.: PCT/GB2010/050386
§ 371 (c)(1),
(2), (4) Date: Sep. 9, 2011

(87) PCT Pub. No.: WO2010/103305
PCT Pub. Date: Sep. 16, 2010

(65) Prior Publication Data
US 2012/0000864 A1 Jan. 5, 2012

(30) Foreign Application Priority Data
Mar. 11, 2009 (GB) .................... 0904171.6

(51) Int. Cl.
*B01D 17/038* (2006.01)
*B01D 35/18* (2006.01)
(52) U.S. Cl. ........ 210/788; 210/774; 210/787; 210/175; 210/512.1; 244/135 R
(58) Field of Classification Search .................. 210/774, 210/787, 788, 175, 512.1; 244/135 R
See application file for complete search history.

(56) References Cited

U.S. PATENT DOCUMENTS

| | | | |
|---|---|---|---|
| 4,081,373 A | 3/1978 | Rozniecki | |
| 5,643,470 A | 7/1997 | Amini | |
| 2010/0071774 A1 | 3/2010 | Minty | |

FOREIGN PATENT DOCUMENTS

| | | |
|---|---|---|
| WO | 00-47305 A1 | 8/2000 |
| WO | 2008-059288 A1 | 5/2008 |
| WO | WO 2010103305 A2 * | 9/2010 |

OTHER PUBLICATIONS

Written Opinion for PCT/GB2010/050386, Oct. 2010.*
International Search Report for PCT/GB2010/050386 mailed Oct. 28, 2010.
British Search Report for 0904171.6 dated Jul. 7, 2009.

* cited by examiner

*Primary Examiner* — David A Reifsnyder
(74) *Attorney, Agent, or Firm* — Lowe, Hauptman, Ham & Berner, LLP

(57) ABSTRACT

A fuel system comprising a liquid fuel tank, an engine, and a cyclonic separator having an inlet fluidically connected to the fuel tank, a first outlet fluidically connected to an engine fuel feed system, and a second outlet. The cyclonic separator is adapted to discharge relatively denser material from the first outlet and relatively less dense material from the second outlet. The fuel system may be used to remove water or ice from the fuel tank by separating the liquid fuel in the tank into water rich fuel and purified fuel using the cyclonic separator. The water rich fuel is discharged to the engine where the water is burnt off with the fuel. The cyclonic separator may be retrofit in an existing fuel system. The fuel system may be in an aircraft.

18 Claims, 14 Drawing Sheets

CYCLONIC SEPARATOR

RELATED APPLICATIONS

The present application is National Phase of International Application Number PCT/GB2010/050386, filed Mar. 5, 2010 and claims priority from, British Application Number 0904171.6, filed Mar. 11, 2009.

FIELD OF THE INVENTION

The present invention relates to a fuel system including a cyclonic separator. Also, a method of removing water or ice from a fuel tank, and a method of installing a cyclonic separator in a fuel system.

BACKGROUND OF THE INVENTION

Water is an unavoidable contaminant in fuel. Water can affect components in fuel systems and lead to operational delays and increased maintenance activities. In addition, the propensity for microbiological contamination is directly proportional to the presence of water and the temperature within fuel tanks.

Although water may affect fuel systems of land or water based vehicles, water is a particular problem in aircraft fuel systems. Water may enter aircraft fuel tanks from fuel loaded into the aircraft fuel tanks during refuel (dissolved water) and from air entering the aircraft fuel tanks via its vent system. A vent system to ambient air is normally required to normalise the pressure within the fuel tanks during climb and descent of the aircraft.

Since the solubility of water in fuel decreases with decreasing temperature, during aircraft cruise water dissolution from fuel occurs as the fuel temperature decreases. It forms small droplets of the order of microns. The droplets remain suspended in the fuel and create an almost homogeneous mist or fog-like phenomenon in fuel. The water droplets have a density (around 1000 kg/m$^3$) similar to that of aviation fuel (around 800 kg/m$^3$). The water droplet size and the relative density of the water droplets and the surrounding fuel are key parameters determining the settling rate of the droplets (Stokes' Law). The settling velocity is proportional to the square of the droplet radius. With the droplet size of the order of microns, it takes a long time for the droplets to settle out to the tank bottom. The density difference is small, although significant, but in this case the primary factor determining the slow settling rate of the droplets is their size. The fuel with suspended water droplets is fed to the engine where it is burnt off with the fuel. However, the low concentration of water in suspension means that the rate of water removal from the fuel system is slow.

As the temperature within the fuel tank decreases during the cruise phase of an aircraft flight, the suspended water droplets can turn to ice forming "snow". The snow takes even longer to sink to the bottom of the fuel tank as the density of the ice (around 900 kg/m$^3$) is even closer to that of the fuel than the water droplets.

In addition, the mist or fog-like phenomenon in fuel tends to be cleared off when a sufficient natural convection current is established in the fuel tank. Drier (unsaturated) fuel carried by the natural convection current from colder tank structures and surfaces re-dissolves the suspended water droplets. The natural convection current carries the saturated fuel to bring it in contact with cold tank surfaces where water dissolution from the fuel causes condensation on cold surfaces. The condensation tends to run down the wall of the fuel tank and collect in pools at the bottom of the tank. Water from these pools can be drained off when the aircraft is on the ground but this is time consuming and costly, leading to a loss of operational efficiency.

U.S. Pat. No. 4,081,373 describes a system in which a cyclonic separator and a water coalescer are connected within a fuel system. Fuel from a fuel tank is fed into the cyclonic separator, which spins the fuel into an intense cyclonic spiral, and centrifugal force separates relatively pure fuel from a fuel-impurity concentrate. The combined cyclonic separator and a water coalescer return "purified" fuel to the fuel tank, and a fuel-impurity mixture is fed to an auxiliary separator. The auxiliary separator returns further "purified" fuel to the fuel tank and a water-solid (impurity) sludge is separated out and periodically drained off. The impurity sludge is exhausted either to the atmosphere or to a collection vessel. Where a collection vessel is used this will still need to be drained when the aircraft is on the ground. In the case of exhausting to the atmosphere, a suitable exhaust system will be required, which adds weight, maintenance costs etc. to the fuel system and could lead to icing problems at the outlet.

SUMMARY OF THE INVENTION

A first aspect of the invention provides a fuel system comprising a liquid fuel tank, an engine, and a cyclonic separator having an inlet fluidically connected to the fuel tank, a first outlet fluidically connected to an engine fuel feed system, and a second outlet, wherein the cyclonic separator is adapted to discharge relatively denser material from the first outlet and relatively less dense material from the second outlet.

A second aspect of the invention provides a method of removing water or ice from a fuel tank, the method comprising providing a liquid fuel in a fuel tank, separating the liquid fuel in the tank into water rich fuel and purified fuel using a cyclonic separator, and discharging the water rich fuel to an engine.

A third aspect of the invention provides a method of installing a cyclonic separator in a fuel system, the fuel system comprising a liquid fuel tank and an engine, the cyclonic separator having an inlet, a first outlet and a second outlet, the cyclonic separator being adapted to discharge relatively denser material from the first outlet, and relatively less dense material from the second outlet, the method comprising fluidically connecting the inlet to the fuel tank, and fluidically connecting the first outlet to an engine fuel feed system.

Cyclonic separators for separating solids from liquids, or to separate (or at least concentrate) liquids of different density are also known as hydrocyclones or hydroclones.

In operation, water or ice naturally occurring in the fuel, and which is denser than the fuel, will be separated or at least concentrated by the cyclonic separator to form a water rich fuel mixture which can be fed to the engine to be burnt off. The less dense purified fuel exiting from the second outlet of the cyclonic separator is preferably fed back into the fuel tank. The concentration of water in the water rich fuel mixture is preferably several orders of magnitude higher than that of the fuel in the tank and so water is removed more quickly from the fuel tank by the fuel system of the present invention. By removing water from the tank, rather than merely dispersing condensation back into the tank, the concentration of water in the tank is kept low and problems associated with water condensation within the tank are prevented, even at low temperatures.

In relation to an aircraft fuel system, the lowest temperatures within the tank are encountered during the cruise portion of flight and so the cyclonic separator is preferably operated during the cruise, so as to remove water when condensation would otherwise most likely occur. It is preferable to remove the water when the water is suspended in the fuel. Once condensation occurs and water droplets have coalesced into larger droplets, pools and films, water is not readily re-dissolved in the fuel, even when the fuel temperature is raised increasing the solubility of water in fuel. Further devices, such as water scavenging lines, may be required if the water were to be allowed to condense and pool within the tank, leading to increased weight and cost. Since the concentration of water in the water rich fuel is initially much higher than that in the tank, the rate of removal of the water may be initially high and decreases as the water content of the fuel in the tank decreases. Removing water quickly at the start of operation of the cyclonic separator minimises water accumulation in the tank, before the lowest tank temperatures are reached. Although the cyclonic separator is preferably operated during the cruise, it may be operated during any phase of the flight (taxi, take-off, cruise or land). For example, water may be induced from a fuel tank sump into an induction line by a jet pump during the early phase of the flight (taxi and take-off) and discharged with motive flow to the cyclonic separator.

The inlet of the cyclonic separator is preferably connected to a fuel feed line adapted to entrain a mixture of fuel and water or ice from a region of the fuel tank in which water or ice, preferably still in suspension, tends to collect. When fuel flows in the fuel feed line, the mixture becomes entrained into the flow. The feed line may include a porous surface through which the mixture flows to become entrained in the fuel flow. The porous surface may be a grid, mesh or a series of perforations in a wall of the fuel feed line.

The fuel feed line is preferably connected to a fuel pump or forms part of a pressurised system for delivering fuel. The pump may be a jet pump or the like.

The engine fuel feed system is preferably adapted to entrain fuel from the fuel tank. To reduce the concentration of water being fed to the engine, the water rich fuel mixture is mixed with fuel from the tank before being fed to the engine. The concentration of water fed to the engine may be controlled so it does not exceed the recommended limit by the engine manufacturers.

At low temperatures, the suspended water may turn to ice which could potentially build up in the cyclonic separator thus impairing its performance. To manage this, the cyclonic separator may include a heat exchanger. The heat exchanger may include a heat source driven by electronic or hydraulic systems, for example, to prevent ice build-up on an inner surface of the cyclonic separator. There are many heat sources within vehicles, such as aircraft, for which the fuel system is intended, which may be used for this purpose. Alternatively, the cyclonic separator may include an integral heating element as the heat source.

An inner surface of the cyclonic separator may include a hydrophobic coating or an "ice-phobic" coating to prevent or reduce water or ice from adhering to the cyclonic separator. The coating may be a paint or other coating material.

The cyclonic separator may be retrofitted to an existing fuel system in accordance with the method of the third aspect of this invention.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
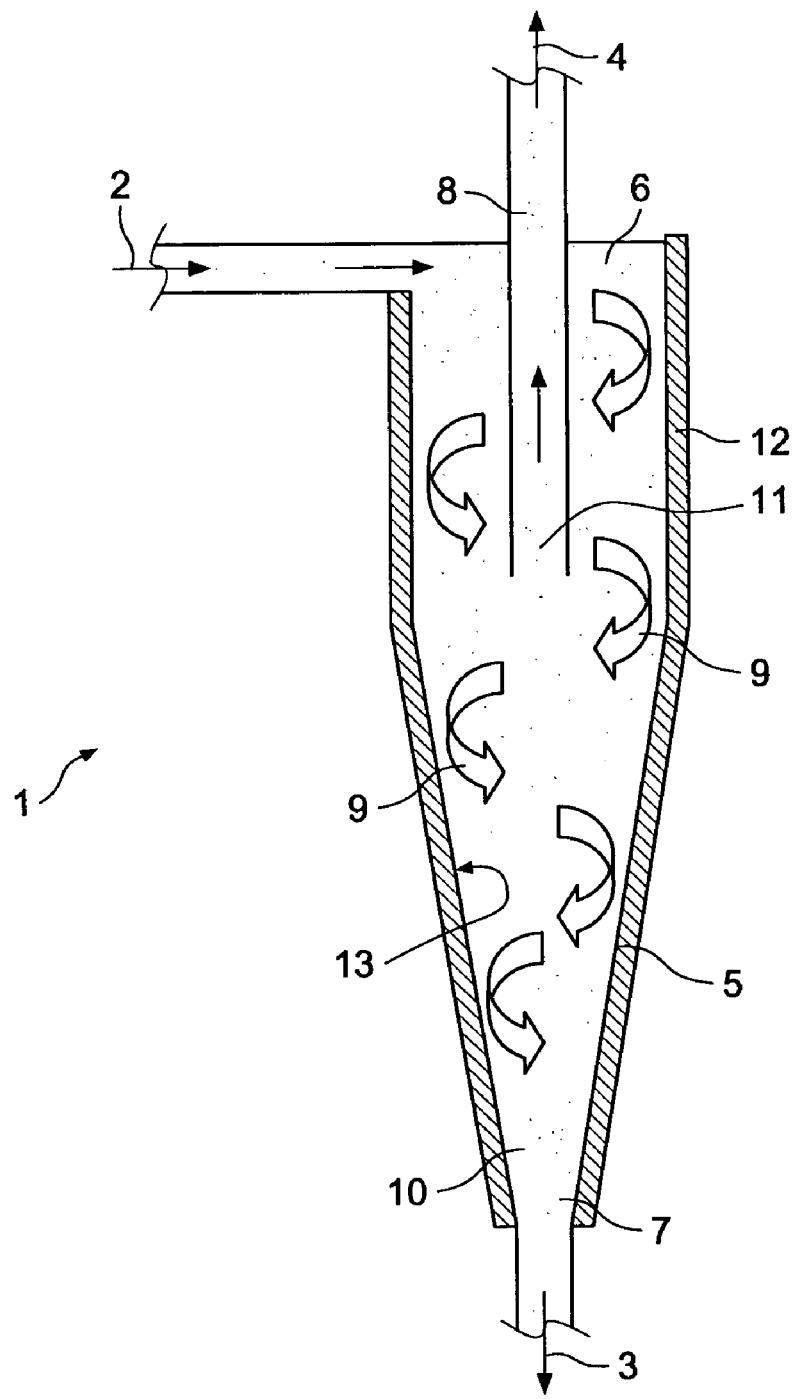
FIG. 1 illustrates schematically a cyclonic separator.

FIG. 1 illustrates schematically a cyclonic separator 1 having an inlet 2, a first outlet 3 and a second outlet 4. The cyclonic separator 1 has a cylindrical upper portion and a conical lower portion. The conical lower portion has a conical housing 5 having a downwardly narrowing, frusto-conical shape that symmetrically extends around a centrally disposed, longitudinal axis. An upper end 6 of the cyclonic separator 1 has a larger diameter and is disposed above a lower end 7 of the cyclonic separator 1 having a smaller diameter. The inlet 2 is disposed adjacent the upper end 6 and the first outlet 3 is disposed adjacent the lower end 7. A pipe 8 extends into the upper portion of the cyclonic separator 1 and is fluidically connected to the second outlet 4.

Figure 2A:
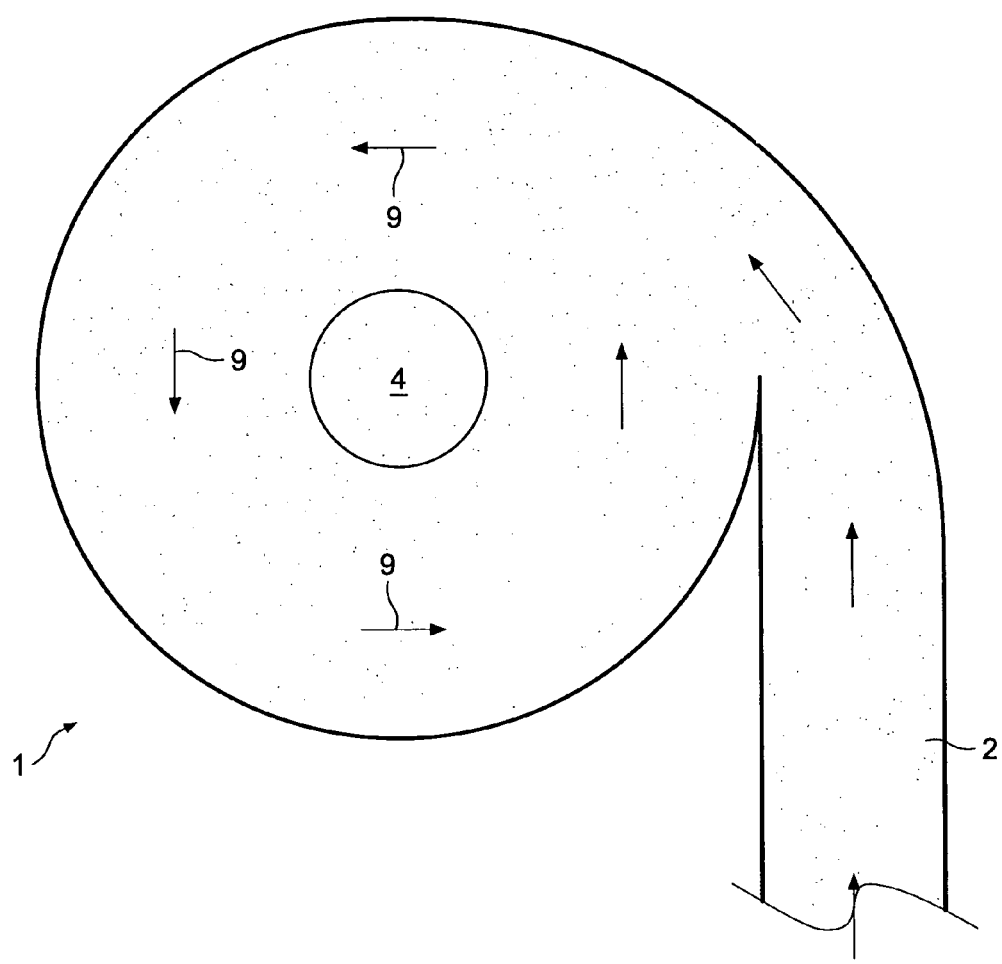
FIG. 2a illustrates schematically a top view of the cyclonic separator.
Figure 2B:
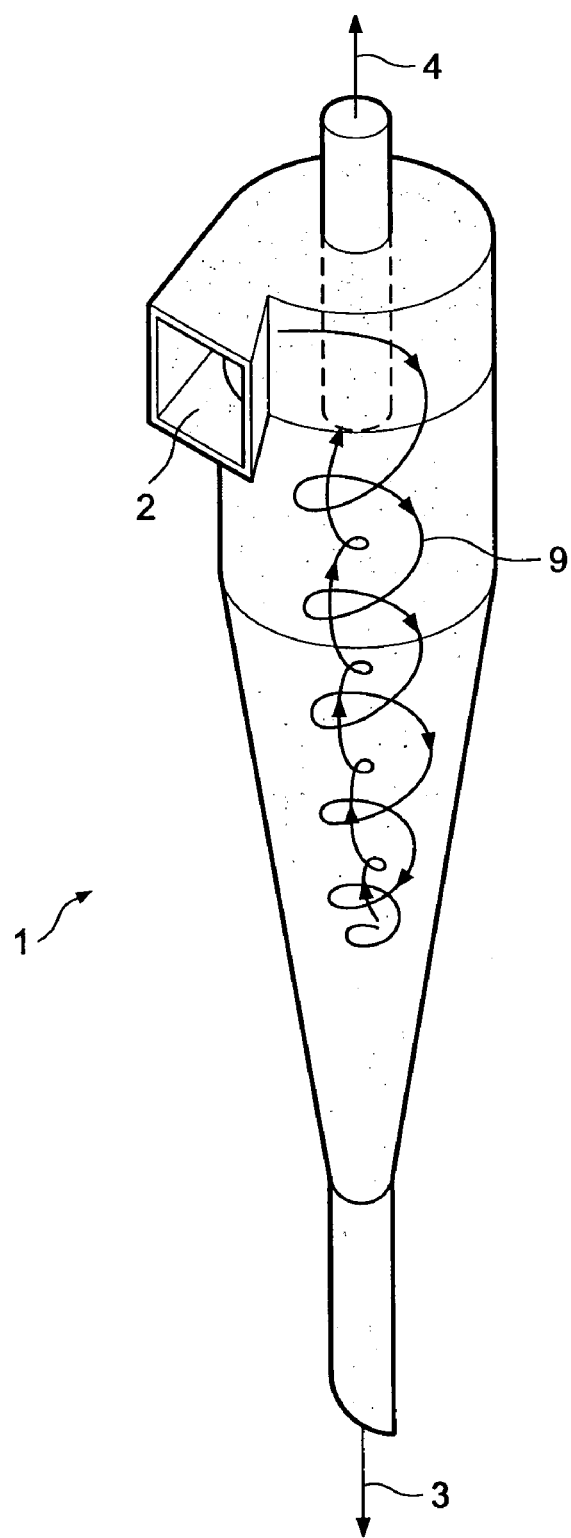
FIG. 2b illustrates schematically a 3D view of the flow within the cyclonic separator during operation.

FIG. 2a illustrates schematically a top view of the cyclonic separator 1 to show the arrangement of the inlet 2 to the upper end 6 of the cyclonic separator 1. FIG. 2b illustrates the three-dimensional flow within the cyclonic separator 1 during operation.

Liquid passing through the inlet 2 is introduced tangentially into the interior of the cylindrical upper portion and flows downwardly in a spiral path 9 (see FIGS. 1 and 2b) through the conical lower portion which tapers, or narrows, as it extends downwardly towards a lower portion 10 of the conical housing 5. The flow is forced into the spiral path 9 due to the tangential entry and the cylindrical/conical shape of the housing. The rotational (spiral) flow generates high centrifugal G-forces such that denser materials suspended in the liquid will move to the outermost circumference within the cross sectional area of the conical housing 5, leaving less dense material in the core of the spiral flow. As the cross sectional area decreases toward the bottom of the housing, excess flow is forced upward in a tight inner (core) spiral (see FIG. 2*b*). An inlet 11 to the pipe 8 is disposed such that relatively less dense material is discharged from the second outlet 4.

The general flow direction of the main spiral flow 9 through the cyclonic separator 1 and the geometry of the conical housing 5 cause the relatively denser molecules and particles to collect in the lower region 10 of the conical housing 5. In this way, relatively denser material is discharged from the first outlet 3.

Although FIG. 1 shows the cyclonic separator 1 oriented vertically, it will be appreciated by those skilled in the art that the cyclonic separator 1 may be oriented non-vertically if space requirements do not permit a vertical orientation.

A heat exchanger 12 is provided around the cylindrical upper portion and the conical lower portion of the cyclonic separator 1 to thaw frozen material, which would otherwise tend to adhere to the inner surface of the cyclonic separator 1. Heat energy is supplied to the heat exchanger 12 from a heat source, which may be a dedicated heat source, or may be a sink for waste heat generated by electrical, hydraulic or other heat generating systems.

An inner surface 13 of the cyclonic separator 1 is painted or coated with hydrophobic or "ice-phobic" paint or material to prevent or reduce water or ice from sticking to the inner surface 13 such that it runs more quickly towards the first outlet 3.

In operation, the cyclonic separator is used in a fuel system to separate or at least concentrate quantities of suspended water, ice and particulate material from within fuel. A high volumetric fuel flow is forced into the inlet 2 of the cyclonic separator 1. The flow in the inlet 2 is perpendicular to the central axis of the conical housing 5. Centrifugal force will cause the more dense ice, water and particulate material to move to the outer peripheral proportion of the interior of the conical housing 5, and against the inner surface 13 of the conical housing 5 as the flow travels along the spiral path 9. Less dense, purified fuel will pass within the central region of the interior of the conical housing 5 and into the inlet 11 of the pipe 8. The pipe 8 passes the purified fuel to the second outlet 4.

The main driver of the flow through the cyclonic separator 1 is from the high volume flow rate flow entering the inlet 2. The first outlet 3 may discharge to a relatively low static pressure region which provides some effect drawing flow through the cyclonic separator. Nevertheless, this effect is only secondary. The outflow from the second outlet 4 is driven by the flow in the cyclonic separator 1. The diameter of the first outlet 3 and the second outlet 4 are sized such that the cyclonic separator 1 gives desirable operational characteristics. The diameter of the second outlet 4 may be greater than, less than, or equal to the diameter of the first outlet 3. The outflow of the second outlet 4 may be connected to a suction device or system, to optimise the outflow characteristic.

The cyclonic separator 1 has two lines of defence to prevent ice sticking on the inner surfaces 13 of the cyclonic separator 1. The primary defence is the hydrophobic and/or ice-phobic coating on the inner surface 13. The coating is applied to all inner surfaces of the cyclonic separator 1. The secondary defence is heating of the inner surfaces 13 by heat exchangers 12. The heat applied is optimised such that any ice particles on the inner surfaces 13 of the cyclonic separator 1 would be melted at the contact point allowing the ice particles to be sheared off by the spiral flow 9. It should be noted that it is not intended to melt the suspended ice particles in the spiral flow 9. Water in the spiral flow 9 is prevented or discouraged from sticking to the inner surfaces 13 of the cyclonic separator 1 by the hydrophobic coating on the inner surfaces 13. A mixture of water, fuel and any particulate matter and remaining ice passes through the first outlet 3 of the cyclonic separator 1.

Figure 3:
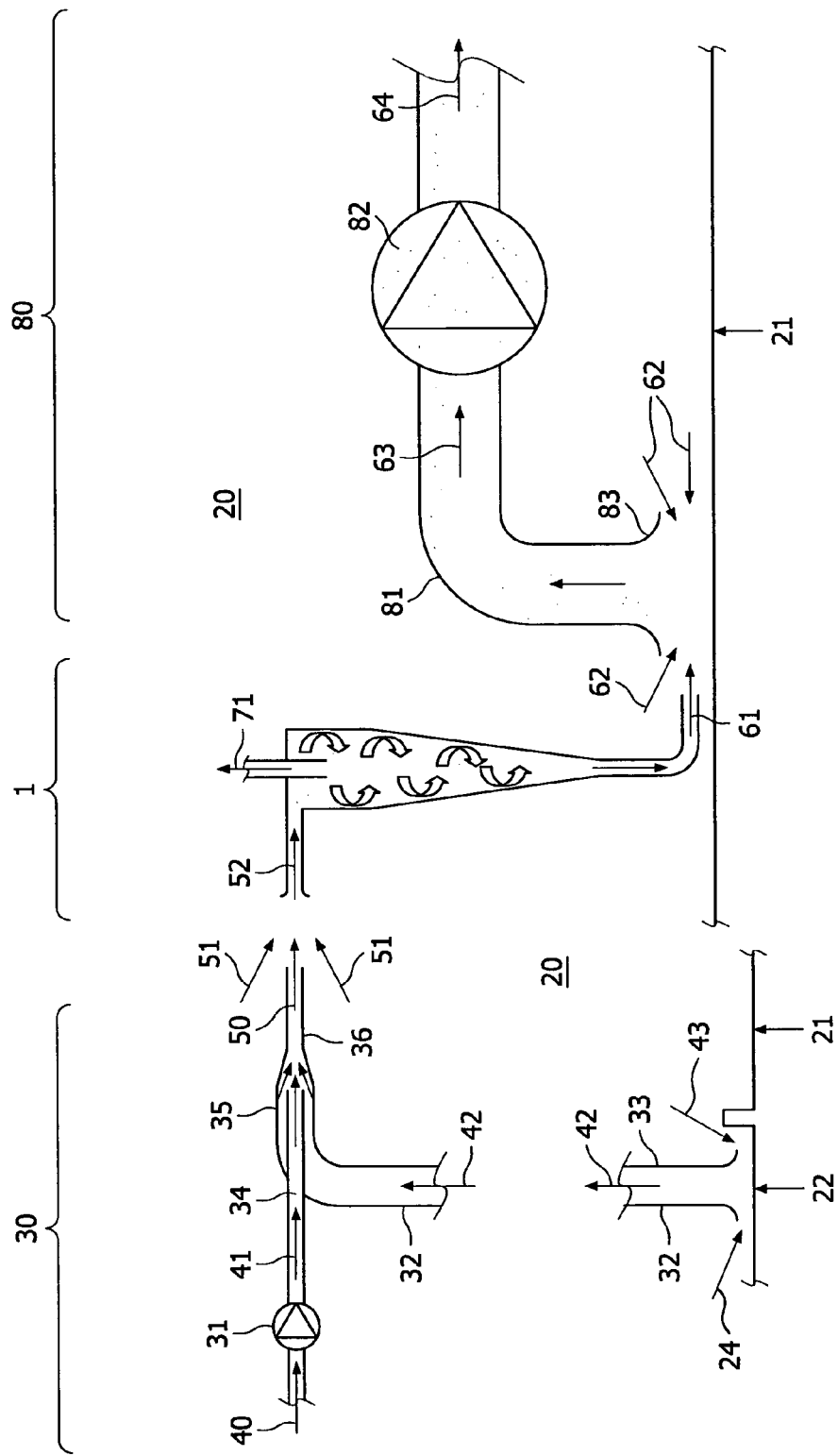
FIG. 3 illustrates schematically a fuel system incorporating the cyclonic separator of FIG. 1.

FIG. 3 shows the cyclonic separator 1 installed in a fuel system. The fuel system includes the cyclonic separator 1, a fuel tank 20 having a floor 21, and an engine (not shown in FIG. 3) which consumes the fuel. Flow 52 to the inlet 2 of the cyclonic separator is delivered by a water scavenge jet pump system 30. The second outlet 4 of the cyclonic separator 1 returns a flow 71 of purified fuel to an optimized region (typically an upper region) of the fuel tank 20. The water rich fuel flow 61 discharged from the first outlet 3 of the cyclonic separator 1 is fed to the engine by an engine feed system 80.

The water scavenge jet pump system 30 will now be described in greater detail below. The water scavenge jet pump system 30 includes a motive flow line 34 having a pump 31, an induced flow line 32, a jet pump 35, and a mixed flow line 36. The pump 31 draws a flow 40 from the tank 20 and delivers a flow 41 under pressure in the motive flow line 34 to the jet pump 35. The induced flow line 32 delivers a flow 42 from a sump 22 of the fuel tank 20 to the jet pump 35. The jet pump 35 mixes the flows from the motive flow line 34 and the induced flow line 32 and discharges a mixed flow 50 in the mixed flow line 36.

The fuel tank sump 22 is an integral part of the tank 20. It is located at the lowest point of the tank 20. Any free water in the tank, over a period of time, will run down as a flow 24 of water and be collected in the sump 22. The induced flow line 32 has a bell-mouth inlet 33 disposed adjacent the sump 22.

At the start of operation of the water scavenge jet pump system 30, there may be a finite volume of water collected in the sump 22. The motive flow 41 induces the flow 42 in the induced flow line 32. Any free water in the sump 22 would be picked up by entrainment in flow 43 entering the bell-mouth inlet 33 from the tank 20. The jet pump 35 atomizes the water into small droplets in the flow 50. The mixed flow 50 is delivered to the cyclonic separator inlet 2 by a flow arrangement to be described in greater detail with reference to FIG. 4 below. When all the free water in the sump 22 has been consumed, the induced flow line 32 will induce fuel from the tank 20 since the sump is an integral part of the tank.

Figure 4:
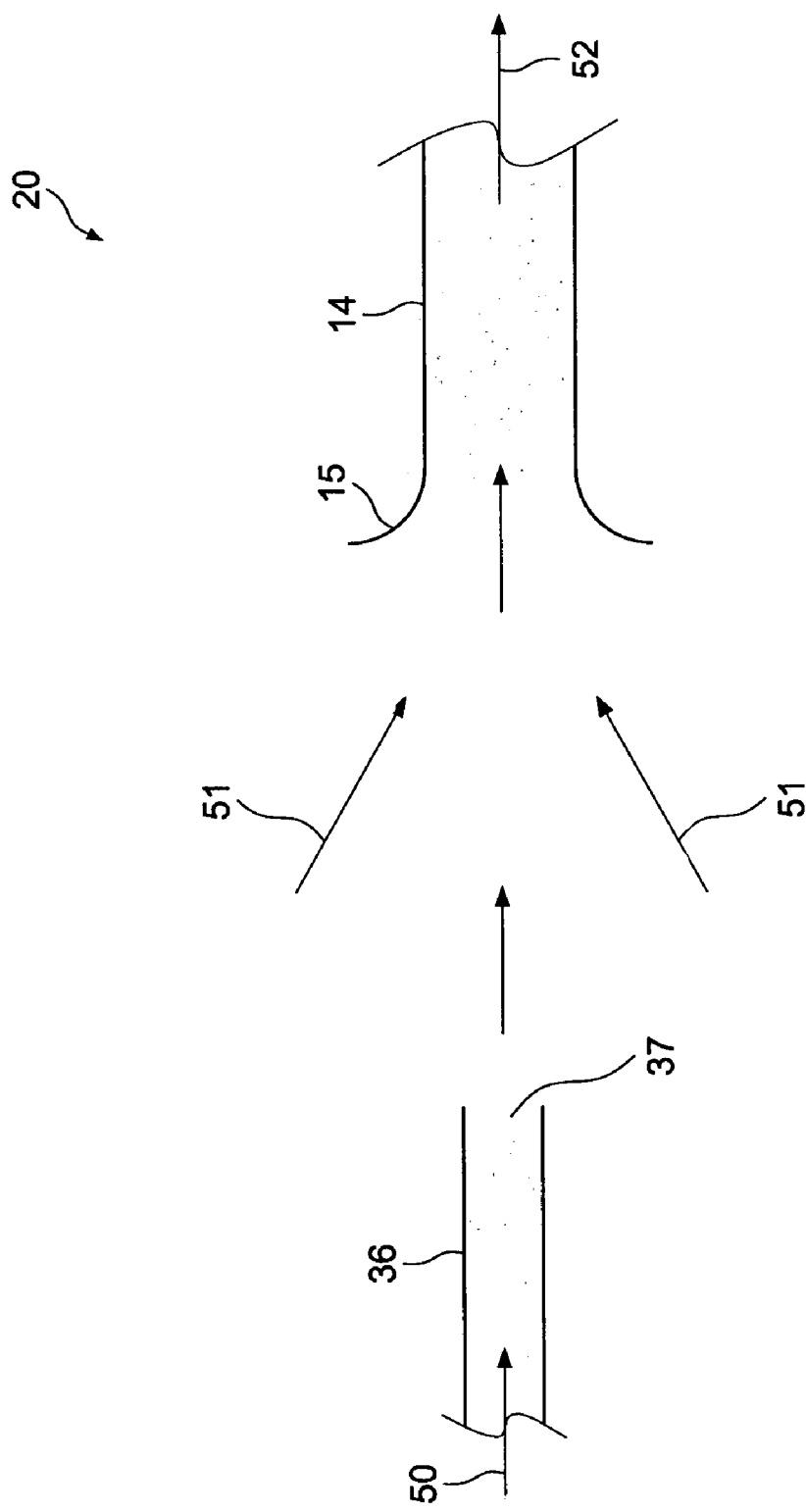
FIG. 4 illustrates schematically detail of the flow arrangement upstream of the inlet of the cyclonic separator in the fuel system of FIG. 3.

Referring to FIG. 4, there is shown schematically detail of the flow arrangement just upstream of the inlet 2 of the cyclonic separator 1 in the fuel system of FIG. 3. The mixed flow line 36 carries the high volumetric mixed flow 50. The cyclonic separator inlet 2 has a flow line 14 having a bell-mouth shaped inlet 15 separated from an outlet 37 of the mixed flow line 36. The flow 50 in the mixed flow line 36 entrains a flow 51 of fuel and any water suspended therein from within the fuel tank 20 as it passes between the outlet 37 of the mixed flow line 36 and the inlet 15 of the flow line 14.

The flow lines 36 and 14 are preferably disposed near the bottom of the tank 20, primarily because the engine feed system 80 is mounted at the bottom of the tank. Additionally, since the cyclonic separator 1 is designed to return the purified fuel flow 4 to an upper region of the tank, over a period of operation the cyclonic separator 1 will create a suspended water concentration stratification such that the higher concentration is found near the bottom of the tank. Therefore, by disposing the flow lines 36 and 14 near the bottom of the tank, fuel having the higher concentration of water in suspension is entrained the into the flow 52 in the flow line 14, such that the system can benefit from this stratification and operate at optimal conditions. However, it will be appreciated by those skilled in the art that the flow lines 36, 14 need not be provided at the bottom of the tank.

The flow 52 of fuel and water, and any ice or other particulate material, is fed under pressure of the jet pump 35 from flow line 36 into the inlet 2 of the cyclonic separator 1.

Figure 5:
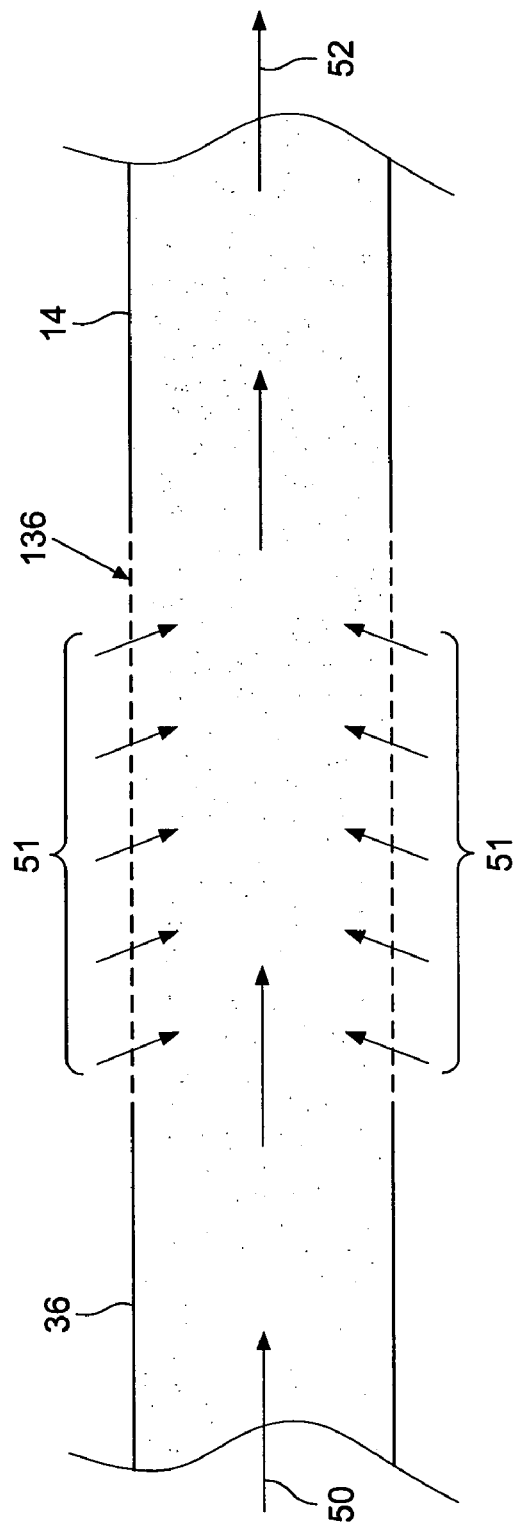
FIG. 5 illustrates schematically an alternative flow arrangement upstream of the inlet of the cyclonic separator to replace that shown in FIG. 4 in the fuel system of FIG. 3.

Referring now to FIG. 5, there is shown schematically a second, alternative flow arrangement just upstream of the inlet 2 of the cyclonic separator 1 which may replace the flow arrangement shown in FIG. 4. In the second, alternative flow arrangement the flow lines 36 and 14 are connected by a porous flow line 136 carrying the high volumetric mixed flow 50 of fuel which may contain some suspended water, ice or other particulate material from the water scavenge jet pump system 30. As the flow 50 passes through the porous flow line 136 it entrains the flow 51 of fuel and any water suspended therein from within the tank 20. The porous flow line has a porous wall which may include a series of perforations or may be a mesh, or the like. The resultant flow 52, is discharged to the inlet 2 of the cyclonic separator 1. The porous flow line 136 is preferably disposed near the bottom of the fuel tank 20 for the same reasons outlined for the arrangement depicted in FIG. 4.

Returning to FIG. 3, the first outlet 3 of the cyclonic separator 1 discharges the water rich fuel flow 61 of water, fuel and any particulate matter and remaining ice. Since the cyclonic separator 1 will tend to discharge any particulate matter from the first outlet 3 rather that the second outlet 4, suitable filtering means may be required downstream of the first outlet 3 of the cyclonic separator 1. Such a filter may need to be periodically cleaned or replaced. The cyclonic separator 1 acts to prevent recirculation of particulate matter around the fuel tank 20 and the filter would act to prevent any such particulate matter from entering the engine.

The purified fuel exiting the cyclonic separator 1 via the second outlet 4 is fed back into the fuel tank, preferably to an upper region of the fuel tank. In this way, the fuel recirculated back into the fuel tank has a significantly lower concentration of water, ice or particulate material than the fuel entering the inlet 2 of the cyclonic separator 1 from the fuel tank.

The engine feed system 80 will now be described in greater detail below. The engine feed system 80 includes an engine feed line 81 and an engine feed pump 82. The engine feed line 81 has a bell-mouth inlet 83 which is disposed adjacent the tank floor 21. The inlet 83 has a mesh (not shown) across its mouth for filtering out larger particulate matter entering the engine feed line 81. Additional filtering means may be provided elsewhere in the engine feed system 80 for filtering out finer particulate matter. The engine feed pump 82 directs a flow 64 of fuel to the engine of the fuel system. When the engine feed pump 82 is operated, a flow 62 of fuel is drawn from the tank 20 into the engine feed line 81 via the inlet 83. The inlet 83 is disposed near the bottom of the tank to minimise the unusable fuel in the tank. The concentration of suspended water will tend to be higher due to the flow 61 from the first outlet 3 of the cyclonic separator 1. During operation, the water rich fuel flow 61 discharged from the first outlet 3 of the cyclonic separator 1 is entrained into the flow in the engine feed line 81, indicated by flow line 63.

Figure 6:
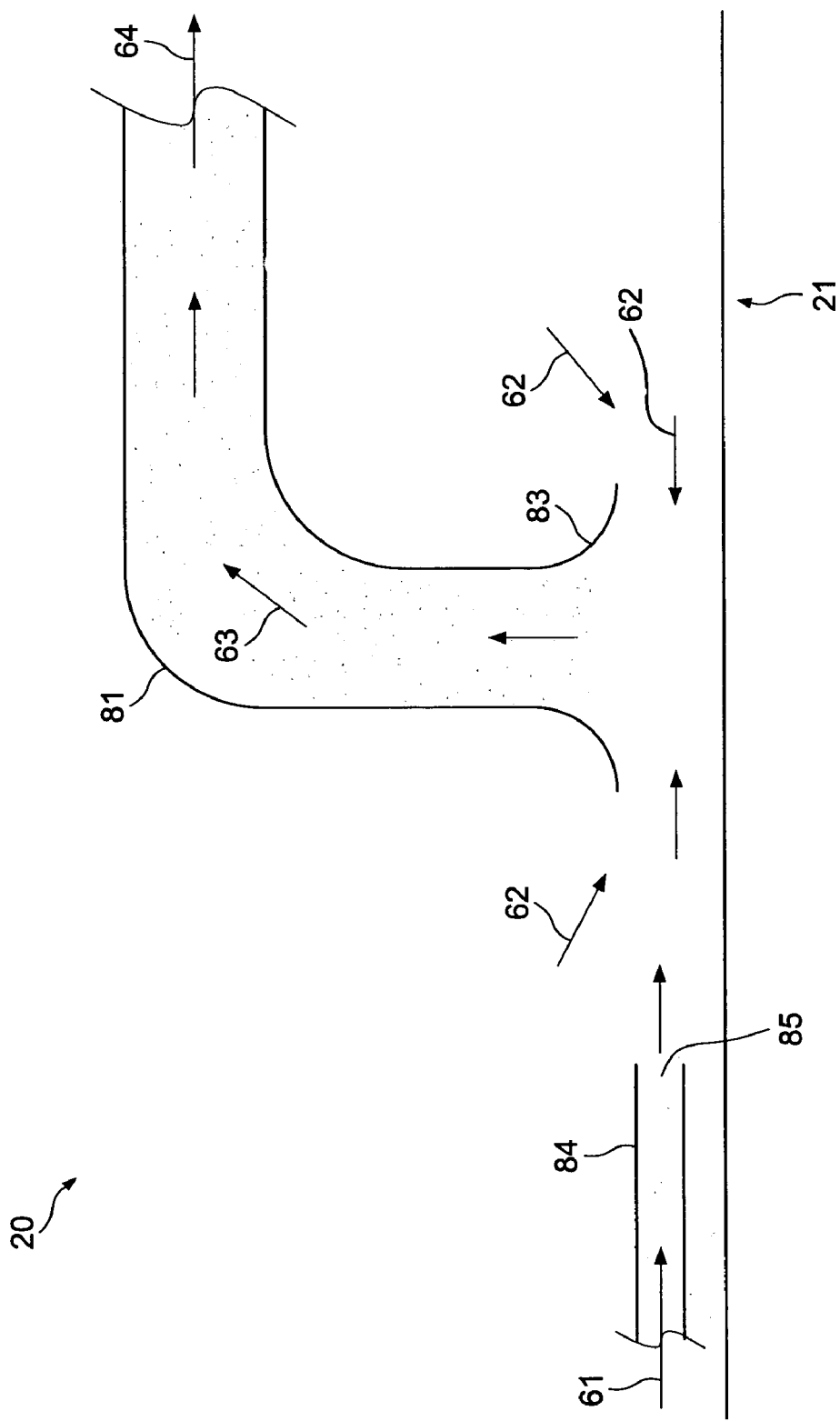
FIG. 6 illustrates schematically detail of the flow arrangement downstream of the first outlet of the cyclonic separator in the fuel system of FIG. 3.

Referring to FIG. 6, there is shown schematically detail of the flow arrangement just downstream of the first outlet 3 of the cyclonic separator 1 of the fuel system of FIG. 3. The water rich fuel flow 61 flowing from the first outlet 3 of the cyclonic separator 1 flows in discharge line 84. Discharge line 84 has an outlet 85 positioned adjacent the tank floor 21 and adjacent the inlet 83 of the engine feed line 81. The water rich fuel flow 61 is entrained into the fuel flow 62 drawn into the inlet 83 of the engine feed line 81 when the engine feed pump 82 is operated.

It is important that the concentration of water in the engine feed line 81 is controlled such that it does not exceed the limit recommended by the engine manufacturer. The concentration of water in the flow 63 in the engine feed line 81 may be controlled by a suitable valve or other fuel control device. The engine consumes the water in the fuel fed to it such that water is removed from the fuel tank 20 during operation.

Figure 7:
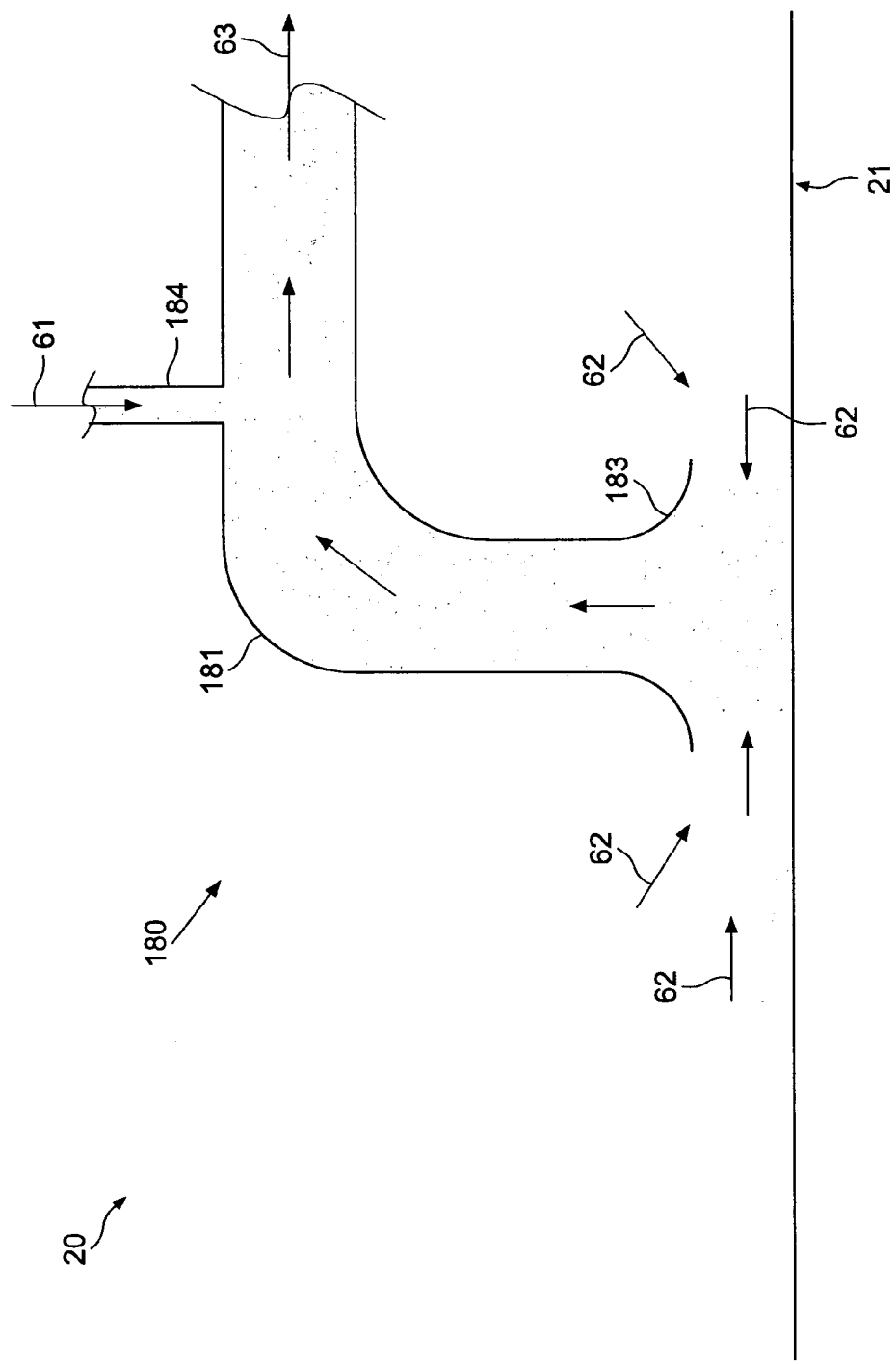
FIG. 7 illustrates schematically an alternative flow arrangement downstream of the first outlet of the cyclonic separator to replace that shown in FIG. 6 in the fuel system of FIG. 3.

A second, alternative flow arrangement in the engine feed system downstream of the first outlet 3 of the cyclonic separator 1 is shown schematically in FIG. 7. The engine feed system 180 is identical to the engine feed system 80 with the exception that the water rich fuel flow 61 flowing from the first outlet 3 of the cyclonic separator 1 flows directly into the engine feed line. The water rich fuel flow 61 flows in discharge line 184, which is fluidically connected to the engine feed line 181 between its bell-mouth inlet 183 and the engine feed pump (not shown in FIG. 7). Flow 62 of fuel from the tank floor 21 is drawn into the engine feed line 181 at the inlet 183 when the engine feed pump is operational. The flow 61 is entrained into the flow 62 in the engine feed line 181 to form flow 63 which is pumped by the engine feed pump to the engine further downstream. The engine consumes the fuel and water in the flow 63. The concentration of water in the fuel flow 63 may be controlled by a suitable valve or other fuel management device in a similar manner to the flow arrangement depicted in FIG. 6.

Figure 8:
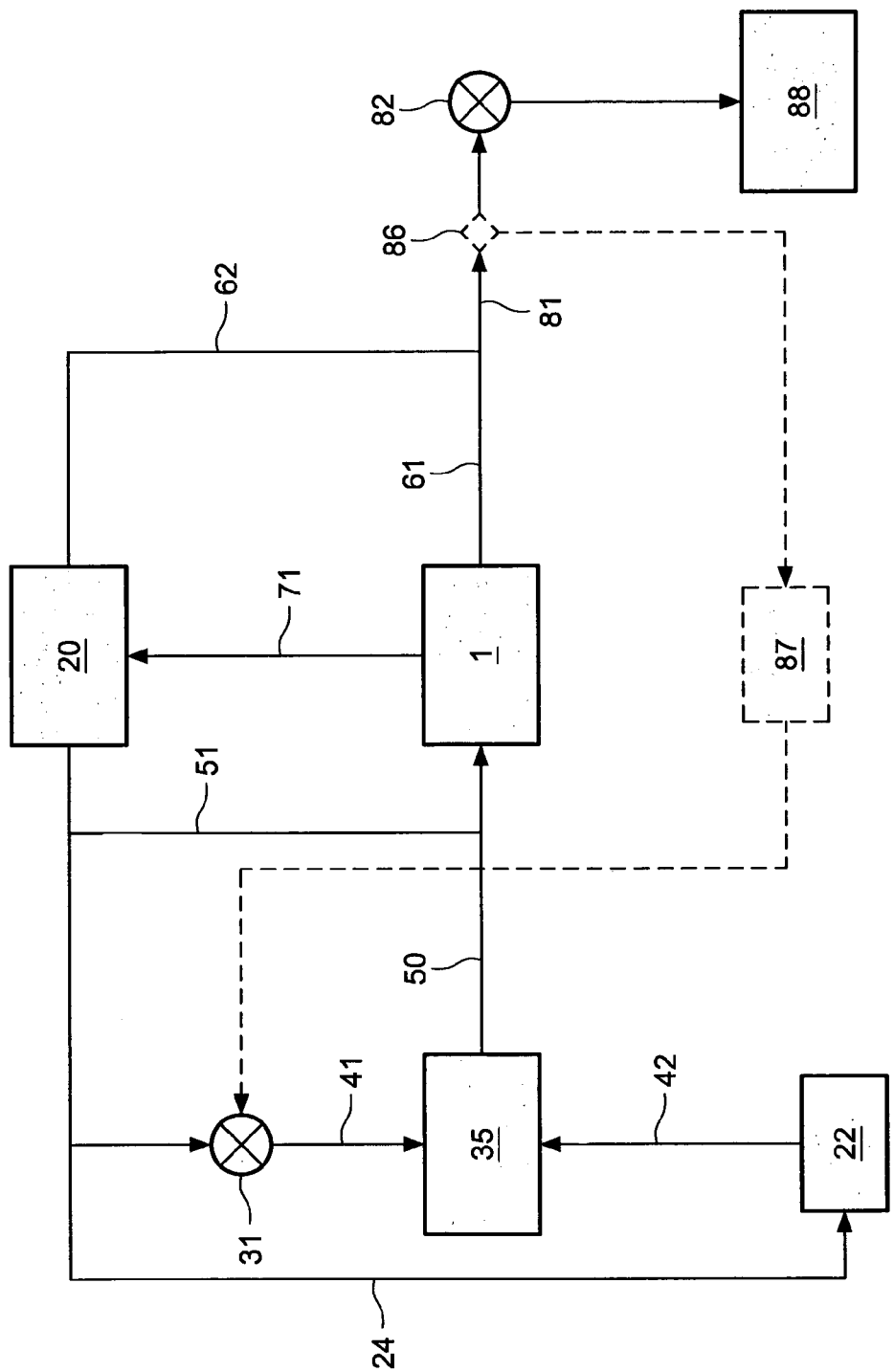
FIG. 8 illustrates a block diagram of the general arrangement of the fuel system of FIG. 3.

FIG. 8 is a block diagram of the general arrangement of the fuel system shown in FIG. 3. Flow paths and flow components are shown in solid line and control links and control components are shown in broken line. The flow paths and flow components are described above with respect to FIG. 3. The fuel system further includes a sensor 86 in the engine feed line 81 (or 181) to detect the concentration of suspended water in the flow 63 in the engine feed line 81 to the engine 88. A signal from the sensor 86 is processed in a controller 87 to control the pump 31 that delivers the motive flow 41 in the jet pump 35.

By controlling the pump 31, the motive flow 41 and ultimately the mixed flow 50 may be varied. The flow delivered to the cyclonic separator 1 has two effects on the operational characteristics of the cyclonic separator 1. With a lower flow rate to the inlet 2, it would generate a lower rotational (angular) rate and thereby create a lower G-force (centrifugal force) such that it is less efficient to separate dense materials out in the cyclonic separator 1. In addition, with a lower flow rate, the throughput flow through the cyclonic separator 1 is reduced such that there is less flow out at both the first outlet 3 and the second outlet 4 of the cyclonic separator 1. In this way, the concentration of suspended water in the flow 63 to the engine 88 can be controlled.

In addition, controlling the pump 31 controls the mix of induced flow 42 and motive flow 41 in the jet pump 35, which can be used to vary the concentration of water in the mixed flow 50 fed to the cyclonic separator 1. During the early phase of a flight, the induced flow line 32 will be inducing water from the sump 22 and so controlling the pump 31 will be the primary control of the water concentration in the mixed flow 50. When the water in the sump 22 is consumed and the induced flow line 32 is inducing fuel flow from the tank 20, then the water concentration of the mixed flow 50 does not change with varying motive flow 41 since the water concentration in the motive flow would be the same as that in the induced flow 42.

Figure 9:
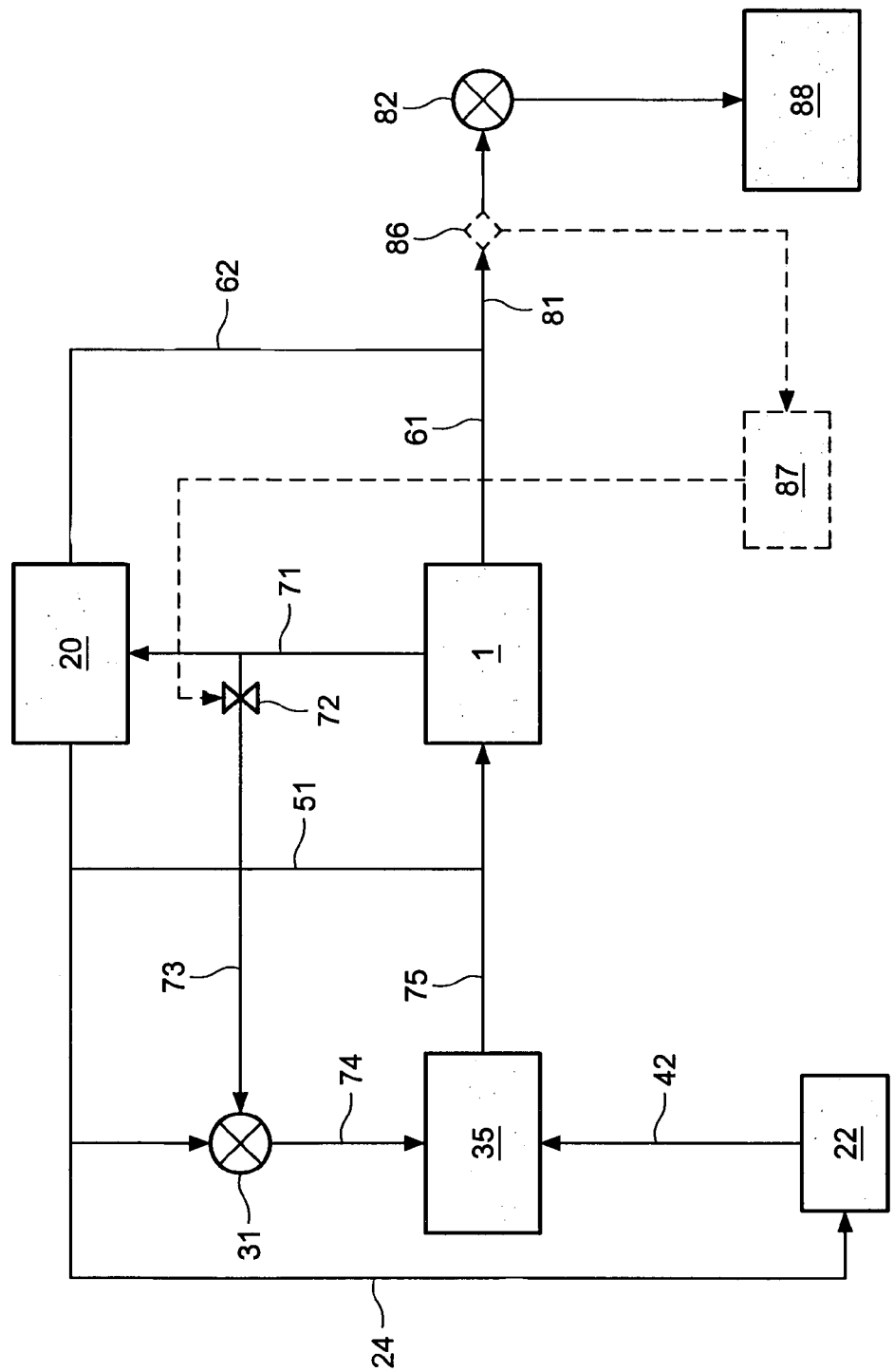
FIG. 9 illustrates a block diagram of the general arrangement of the fuel system of FIG. 3 and having an alternative control philosophy to that shown in FIG. 8.

FIG. 9 is a block diagram of the general arrangement of the fuel system shown in FIG. 3 having an alternative control philosophy to that shown in FIG. 8. Flow paths and flow components are shown in solid line and control links and control components are shown in broken line. The only difference between the fuel system of FIG. 8 and that of FIG. 9 is that the fuel system of FIG. 9 further includes a valve 72 disposed downstream of the second outlet 4 of the cyclonic separator 1 to divert some of the flow 71 to the pump 31 along a purified flow line 73. The valve 72 is controlled by the controller 87 based upon the signal from the sensor 86 to divert an appropriate amount of purified fuel in the flow 71 to the pump 31 to be entrained into a motive flow 74 fed to the jet pump 35. The jet pump 35 discharges a mixed flow 75 to the inlet 2 of the cyclonic separator 1.

In this case, the controller 87 does not affect the flow rate delivered to the inlet 2 of the cyclonic separator 1. The operational characteristics (i.e. throughput and G-force) of the cyclonic separator 1 are therefore unchanged by the controller 87. By controlling the flow 73 of purified fuel to the pump 31, the concentration of water in the motive flow 74 and ultimately the mixed flow 75 may be varied. A higher purified fuel flow rate to the pump 31 reduces the concentration of suspended water in the mixed flow 75, and vice versa. In this way, the concentration of suspended water in the flow 63 to the engine 88 can be controlled.

Figure 10:
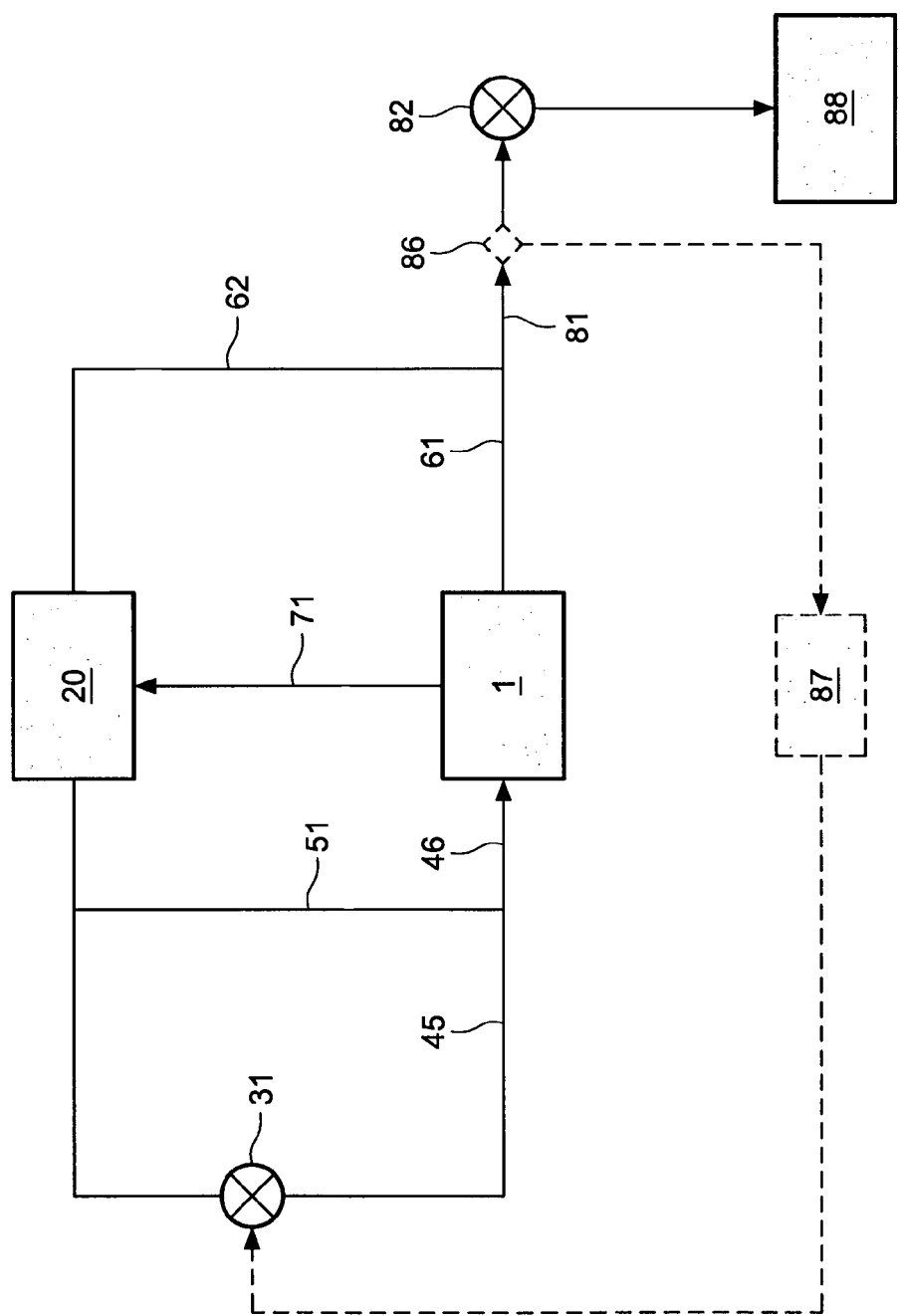
FIG. 10 illustrates a block diagram of an alternative general arrangement of a fuel system including a cyclonic separator.

FIG. 10 is a block diagram of an alternative general arrangement of a fuel system including the cyclonic separator 1. Like reference numerals appearing in FIGS. 8 and 10 denote like entities.

The fuel system shown in FIG. 10 differs from that shown in FIG. 8 in that the jet pump 35 and the sump 22 are omitted, and the pump 31 is arranged to pump a high volumetric flow 45 of fuel (including any water suspended therein) from the tank 20 towards the inlet 2 of the cyclonic separator 1. The flow 45 discharged from the pump 31 entrains the flow 51 of fuel (including any water suspended therein) from the tank 20 to form a mixed flow 46. The flow 46 is referred to as a mixed flow since the flow 45 and the flow 51 could contain different concentrations of suspended water if they are derived from different portions of the tank 20. The mixed flow 46 is fed to the inlet 2 of the cyclonic separator 1.

By controlling the pump 31, the flow 46 delivered to the cyclonic separator 1 may be varied, which controls the operational characteristics (i.e. throughput and G-force) of the cyclonic separator 1, as described with reference to FIG. 8 above. In this way, the concentration of suspended water in the flow 63 to the engine 88 can be controlled.

Figure 11:
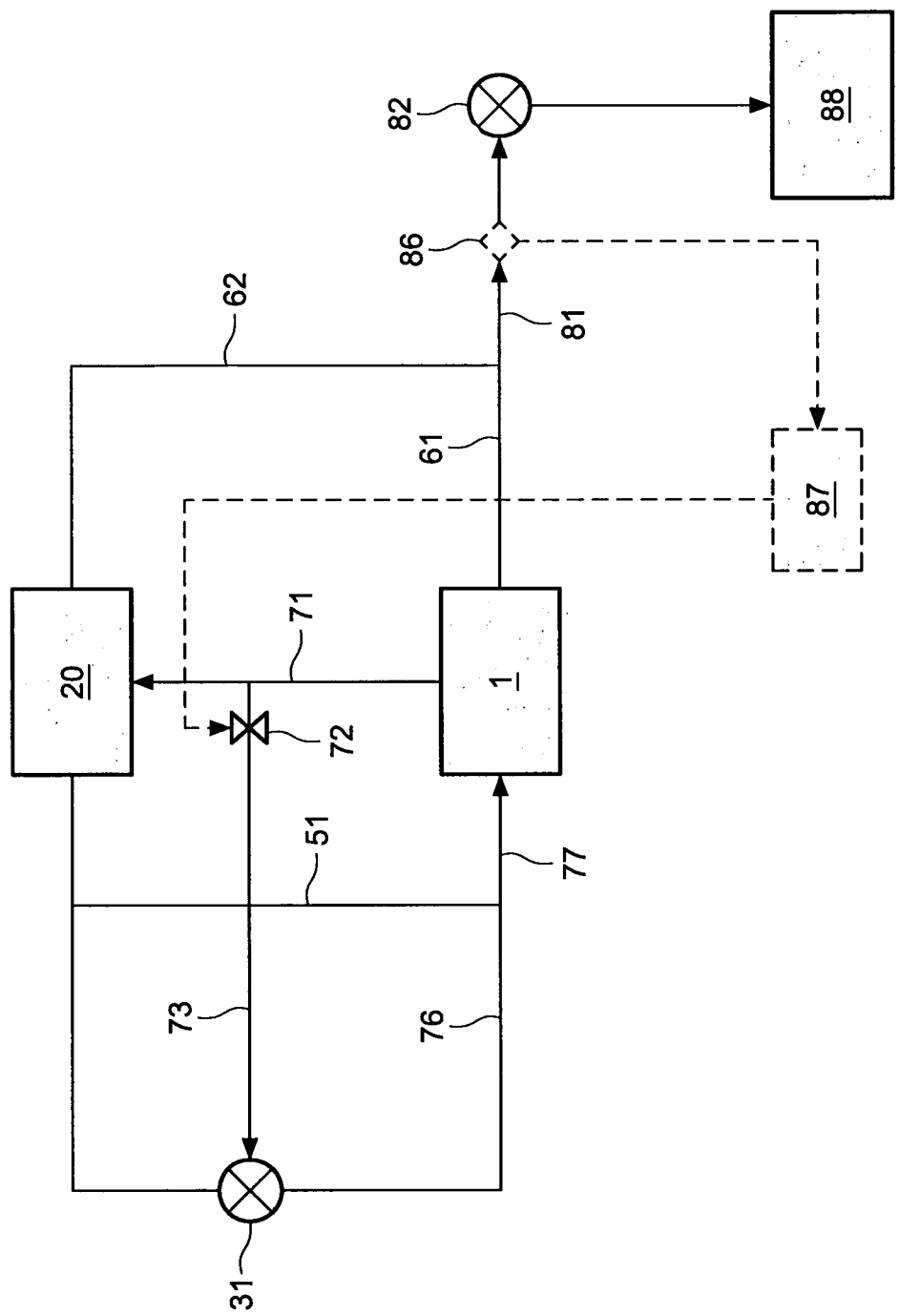
FIG. 11 illustrates a block diagram of a further alternative general arrangement of a fuel system including a cyclonic separator having a different control philosophy to that shown in FIG. 10.

FIG. 11 is a block diagram of an alternative general arrangement of a fuel system including the cyclonic separator 1. Like reference numerals appearing in FIG. 9 and FIG. 11 denote like entities.

The fuel system shown in FIG. 11 differs from that shown in FIG. 9 in that the jet pump 35 and the sump 22 are omitted, and the pump 31 is arranged to pump a high volumetric flow 76 of fuel (including any water suspended therein) from the tank 20 towards the inlet 2 of the cyclonic separator 1. The flow 76 discharged from the pump 31 entrains the flow 51 of fuel (including any water suspended therein) from the tank 20 to form a mixed flow 77. The mixed flow 77 is fed to the inlet 2 of the cyclonic separator 1.

By controlling the flow 73 of purified fuel to the pump 31, the concentration of water in the mixed flow 77 delivered to the inlet 2 of the cyclonic separator 1 may be varied. The controller 87 does not affect the operational characteristics (i.e. throughput and G-force) of the cyclonic separator 1. In this way, the concentration of suspended water in the flow 63 to the engine 88 can be controlled, in a similar manner to that outlined with reference to FIG. 9 above.

An existing fuel system comprising a fuel tank, an engine, an engine feed pump and an engine feed line may be modified to accommodate the present invention as set out below. One or more of the cyclonic separators needs to be fluidically connected between the fuel tank and the engine feed line, with the first outlet discharging towards the engine feed line and the second outlet discharging back to the fuel tank.

An aircraft fuel system may consist of multiple tanks connected by a network of pipes and have one or more engine feed systems. The engine feed systems may be for powering one or more engines for propulsion and/or for aircraft equipments/systems. The term "engine" is referred to any device that consumes fuel, i.e. internal combustion engine, gas turbine, fuel cell, etc.

At least one cyclonic separator would be used for each engine feed system. In some cases, more cyclonic separators would be used to meet the fuel demand by the engine feed system. These would in general be arranged in parallel. However, the cyclonic separators may alternatively be arranged in a cascade (series) to improve the separation efficiency, with the first outlet of the upstream cyclonic separator discharging to the inlet of the downstream cyclonic separator.

In addition, cyclonic separators may be used to reduce the water concentration in one tank at the expense of increasing the water concentration in another tank. This strategy may be used to confine the water in a limited number (e.g. one or two) of tanks where access to drain the water through water drain valves in the sump may be more accessible than in other tanks.

Figure 12:
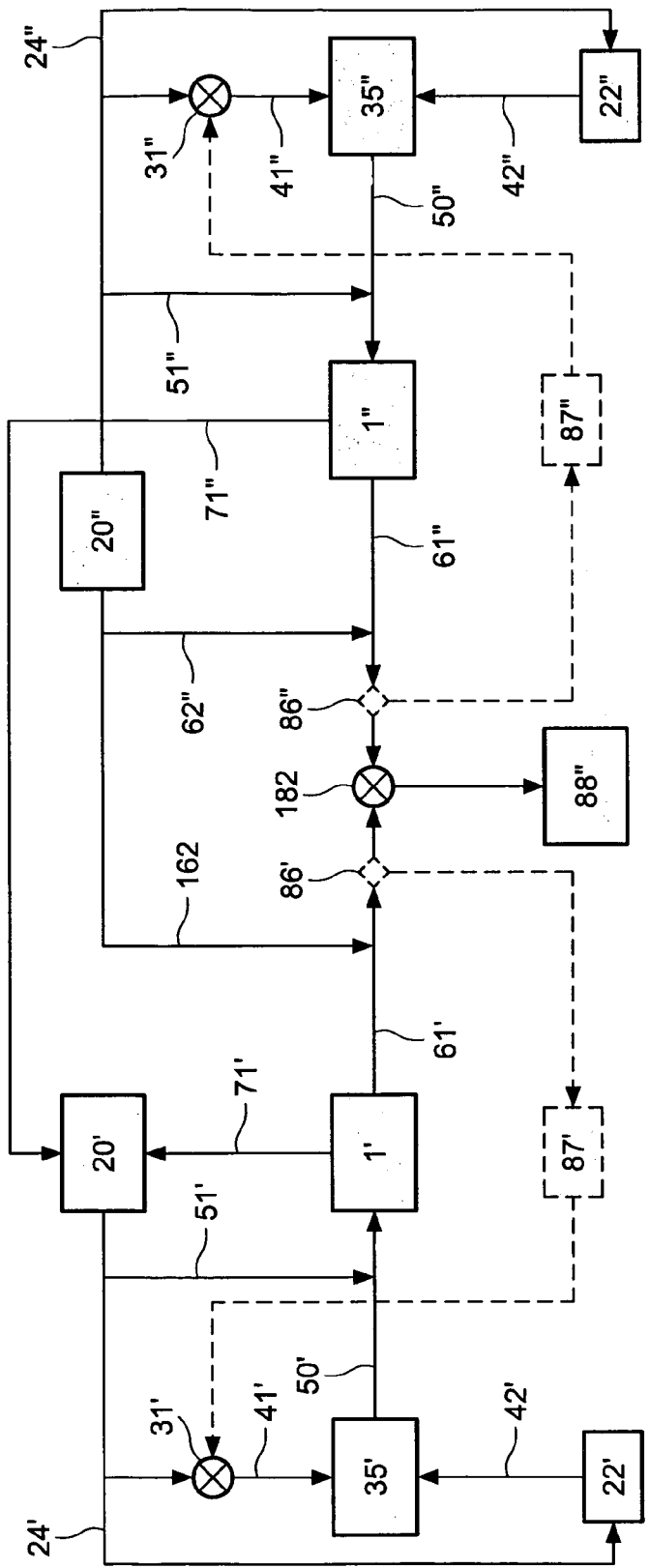
FIG. 12 illustrates a block diagram of a general arrangement of a fuel system including two cyclonic separators, two fuel tanks and one engine feed system arranged to reduce the water concentration in one tank at the expense of increasing the water concentration in the other tank.

FIG. 12 illustrates a block diagram of the general arrangement of such a fuel system having two tanks and one engine feed system. The fuel system essentially includes first and second fuel systems similar to the fuel system shown in FIG. 8. Like parts of the first fuel system and the fuel system of FIG. 8 are denoted by like reference numerals with a prime ('), and like parts of the second fuel system and the fuel system of FIG. 8 are denoted by like reference numerals with a double prime ("). Flow paths and flow components are shown in solid line and control links and control components are shown in broken line.

The fuel system shown in FIG. 12 is arranged such that it has a preference to reduce the concentration of suspended water in the first fuel tank 20'. There is no engine feed line inlet in the first fuel tank 20'. The engine feed line inlet in the second fuel tank 20" not only entrains the flows 61" and 62" (as per the arrangement in FIG. 8), but also the outflow 61' from the first outlet (the denser flow) of first cyclonic separator 1' and a second flow 162 from within the second fuel tank 20". The engine feed line inlet does not entrain flow from within the first fuel tank 20'. The outflow 71" from the second outlet (the less dense, purified fuel flow) of the second cyclonic separator 1" discharges into the first fuel tank 20'.

The fuel in the tank that is fed to the cyclonic separator may include some suspended water droplets. Additionally, fuel from the tank may be mixed with water scavenged from pools at the bottom of the tank which is dispersed in the fuel by a jet pump, or the like, before being fed to the cyclonic separator. The existing fuel system may already include a water scavenge jet pump system, or such a system may be installed at the time of installation of the cyclonic separator. The fuel system may be arranged as shown in FIG. 8, 9 or 12, for example. Alternatively, the fuel system may have no water scavenge jet pump system such that the cyclonic separator is arranged in a pressurised fuel system as, for example, shown in FIGS. 10 and 11. In either case, fuel is fed from the tank to the inlet of the cyclonic separator.

The first outlet of the cyclonic separator discharges water rich fuel in the direction of the engine feed line to be taken up by the engine feed pump and fed to the engine. The fluid connection between the first outlet of the cyclonic separator may be arranged as shown in FIG. 3 (detail in FIG. 6) or as shown in FIG. 7, for example.

A control system for controlling the flow fed to the inlet of the cyclonic separator is installed in the fuel system. The control system may, for example, be as shown in any of FIGS. 8 to 11. The control system in these arrangements includes a sensor in the engine feed line and a controller which controls the fuel flow upstream of the inlet to the cyclonic separator in dependence on the sensor output signal.

The second outlet of the cyclonic separator is connected so as to discharge purified fuel to the tank (as shown in the arrangements of FIGS. 8 to 11), and possibly also to the jet pump or pressurised fuel system upstream of the inlet of the cyclonic separator (as shown in FIGS. 9 and 11).

It will be appreciated that other flow arrangements may similarly be used. Importantly, a high volumetric flow of fuel having a relatively high concentration of water must be drawn from the fuel tank via a pressurised system or a jet pump, or the like, and fed to the inlet of the cyclonic separator.

Figure 13:
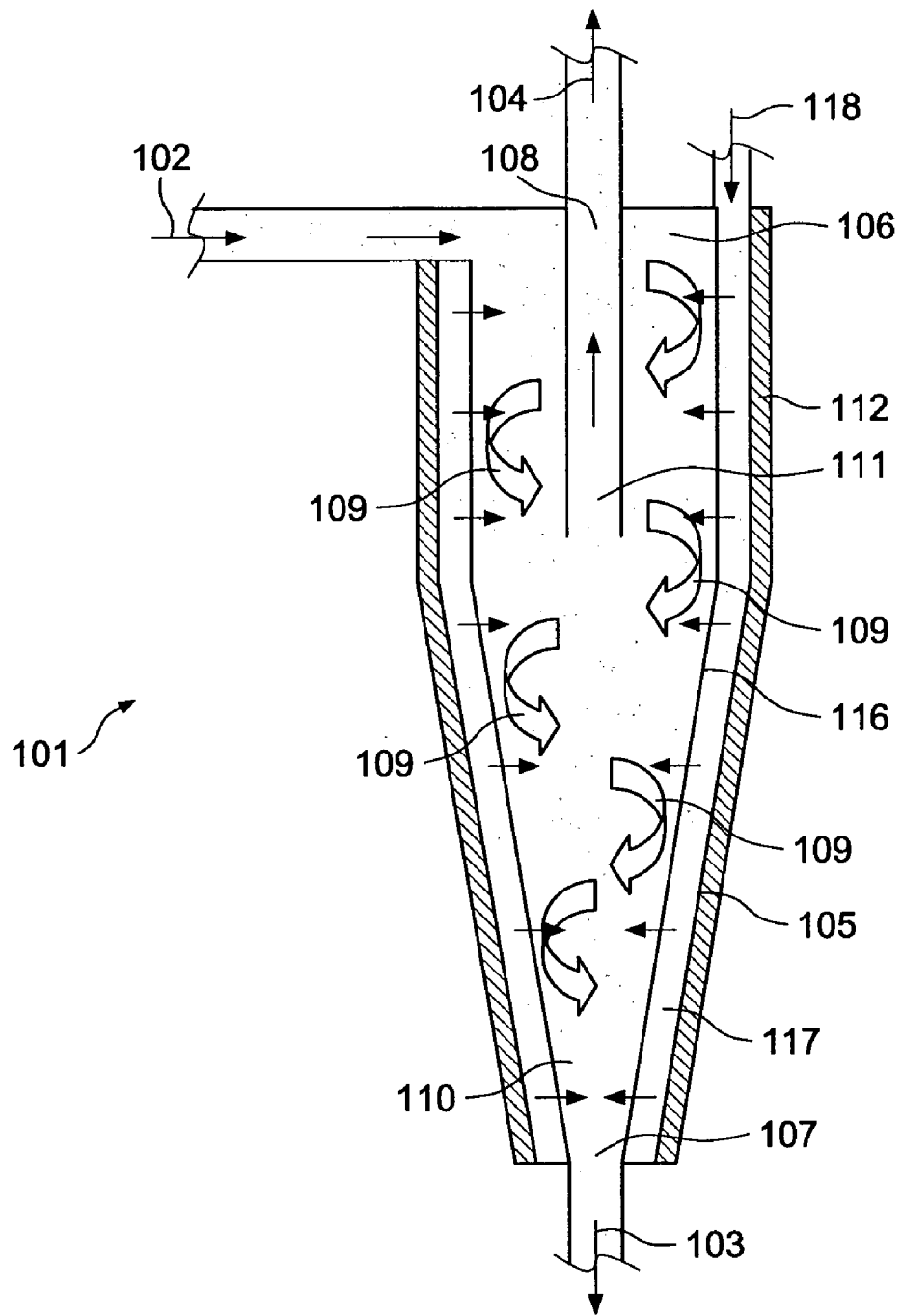
FIG. 13 illustrates schematically an alternative cyclonic separator.

FIG. 13 illustrates an alternative cyclonic separator 101 for use in the fuel system of the present invention. Features of the cyclonic separator 101 which correspond to those of the cyclonic separator 1 have been given the same numeral but in the "100" series in FIG. 13. The cyclonic separator 101 differs from the cyclonic separator 1 only in that a perforated, porous inner wall 116 is interiorly disposed within the housing 105 to form a cavity 117. The cavity 117 is disposed between the inner wall of the housing 105 and the interior volume of the cyclonic separator 101. The cavity 117 has a fluid inlet 118. In use, purified fuel is bled from the flow discharged from the second outlet 104 and pumped into the cavity 117 via the inlet 118 under pressure. A suitable valve device may be used to bleed the purified fuel from the flow discharged from the second outlet 104, and a suitable pump is provided for pumping the bled fuel into the inlet 118. The heat exchanger 112 is optionally provided for heating the purified fuel in the cavity 117. Under the pressure of the pump, the purified fuel in the cavity 117 is driven through the perforated inner wall 116 to create a layer of warm purified fuel on the inner side of the wall 116 so as to prevent water/ice from the spiral flow 109 sticking to the wall 116. This obviates the need for a hydrophobic or ice-phobic coating on the inside of the cyclonic separator 101. The remaining features and functions of the cyclonic separator 101 are identical to those of the cyclonic separator 1.

Since the cyclonic separator will tend to discharge any particulate matter from the first outlet rather that the second outlet, suitable filtering means may be provided in the engine feed system, as described above. In addition, suitable filtering means may be provided upstream of the cyclonic separator to filter out larger particulate matter before the flow enters the cyclonic separator. Such filters may need to be periodically cleaned or replaced. The cyclonic separator acts to prevent recirculation of any remaining particulate matter around the fuel tank, as particulate matter will be discharged from the first outlet rather than the second outlet, to be collected by the filters of the engine feed system.

The fuel system including the fuel tank, cyclonic separator, engine and various feed lines may be an aircraft fuel system. However, the fuel system may be in virtually any land or water based vehicle such as a boat, or a lorry.

In the case of an aircraft fuel system, the heat exchanger of the cyclonic separator may be driven by heat sources within the aircraft such as electrical or hydraulic systems which generate waste heat.

Although the invention has been described above with reference to one or more preferred embodiments, it will be appreciated that various changes or modifications may be made without departing from the scope of the invention as defined in the appended claims.

The invention claimed is:

1. A fuel system comprising a liquid fuel tank, an engine, and a cyclonic separator having an inlet fluidically connected to the fuel tank, a first outlet fluidically connected to an engine fuel feed system, and a second outlet, wherein the cyclonic separator is adapted to discharge relatively denser material from the first outlet and relatively less dense material from the second outlet.

2. A fuel system according to claim 1, wherein the second outlet is fluidically connected to the fuel tank.

3. A fuel system according to claim 1, wherein the inlet of the cyclonic separator is connected to a fuel line adapted to entrain a mixture of fuel and water or ice when fuel flows in the feed line.

4. A fuel system according to claim 3, wherein the fuel line is connected to a fuel pump or forms part of a pressurised system for delivering fuel.

5. A fuel system according to claim 1, wherein the engine fuel feed system is adapted to entrain fuel from the fuel tank when fuel flows in the feed system.

6. A fuel system according to claim 1, wherein the cyclonic separator includes a heat exchanger.

7. A fuel system according to claim 1, wherein an inner surface of the cyclonic separator includes a hydrophobic and/or ice-phobic coating.

8. A fuel system according to any of claim 1, wherein a porous wall is disposed within the cyclonic separator.

9. An aircraft including a fuel system comprising a liquid fuel tank, an engine, and a cyclonic separator having an inlet fluidically connected to the fuel tank, a first outlet fluidically connected to an engine fuel feed system, and a second outlet, wherein the cyclonic separator is adapted to discharge relatively denser material from the first outlet and relatively less dense material from the second outlet.

10. A method of removing water or ice from a fuel tank, the method comprising providing a liquid fuel in a fuel tank, separating the liquid fuel in the tank into water rich fuel and purified fuel using a cyclonic separator, and discharging the water rich fuel to an engine.

11. A method according to claim 10, further comprising returning the purified fuel to the tank.

12. A method according to claim 10, wherein the water rich fuel is mixed with fuel from the fuel tank before being fed to the engine.

13. A method according to claim 10, wherein the cyclonic separator is heated to prevent ice accumulation.

14. A method according to claim 10, performed on an aircraft.

15. A method according to claim 14, wherein the method is performed during the cruise portion of a flight of the aircraft.

16. A method of installing a cyclonic separator in a fuel system, the fuel system comprising a liquid fuel tank and an engine, the cyclonic separator having an inlet, a first outlet and a second outlet, the cyclonic separator being adapted to discharge relatively denser material from the first outlet, and relatively less dense material from the second outlet, the method comprising fluidically connecting the inlet to the fuel tank, and fluidically connecting the first outlet to an engine fuel feed system.

17. A method according to claim 16, further comprising fluidically connecting the second outlet to the fuel tank.

18. A method according to claim 16, wherein the fuel system is on an aircraft.

* * * * *